United States Patent Office 2,768,220
Patented Oct. 23, 1956

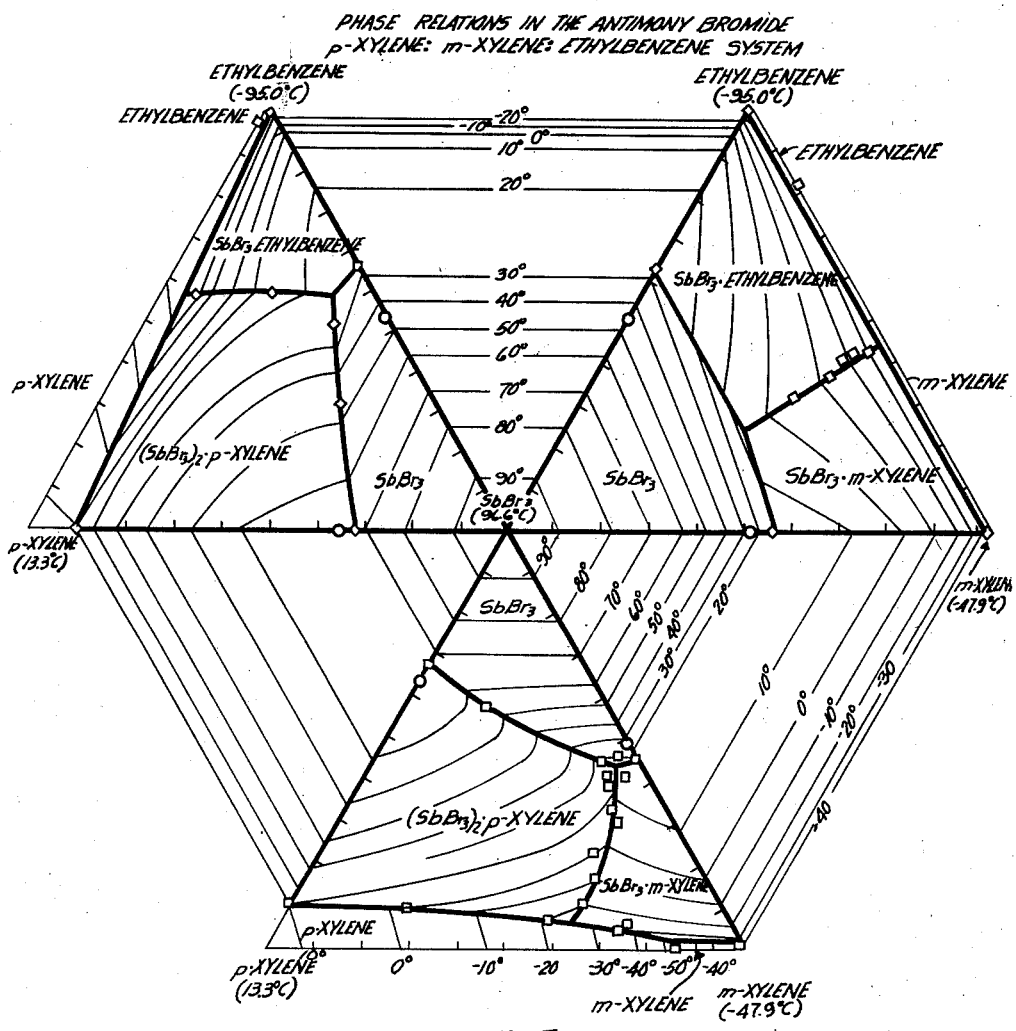
FIG. I
- ○ COMPOSITION OF COMPOUNDS
- □ EUTECTIC POINTS OR INCONGRUENT POINTS
- — PROJECTED EUTECTIC LINES
- — ISOTHERMALS
Inventors: Alan C. Nixon
Carl H. Deal Jr.
By Their Attorney: James Todorovic

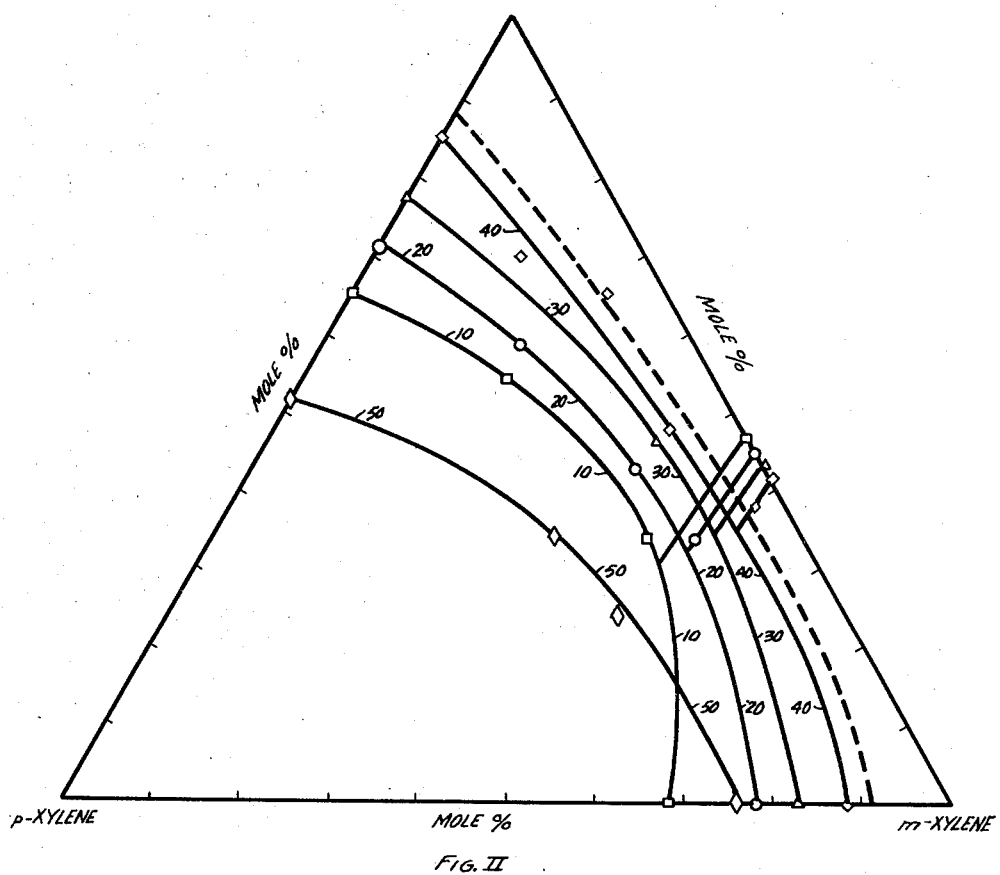
Fig. II
EUTECTIC LINES ON SbBr₃ ISOPLETHIC PLANES
PROJECTED FROM SbBr₃ APEX ONTO EB-m-x-p-x PLANE
□ 10% M SbBr₃
○ 20% M SbBr₃
△ 30% M SbBr₃
◇ 40% M SbBr₃
◊ 50% M SbBr₃
--- LINE OF MAX. EXTENSION OF p-XYLENE COMPLEX
Inventors:    Alan C. Nixon
              Carl H. Deal Jr.
By Their Attorney: James Todorovic

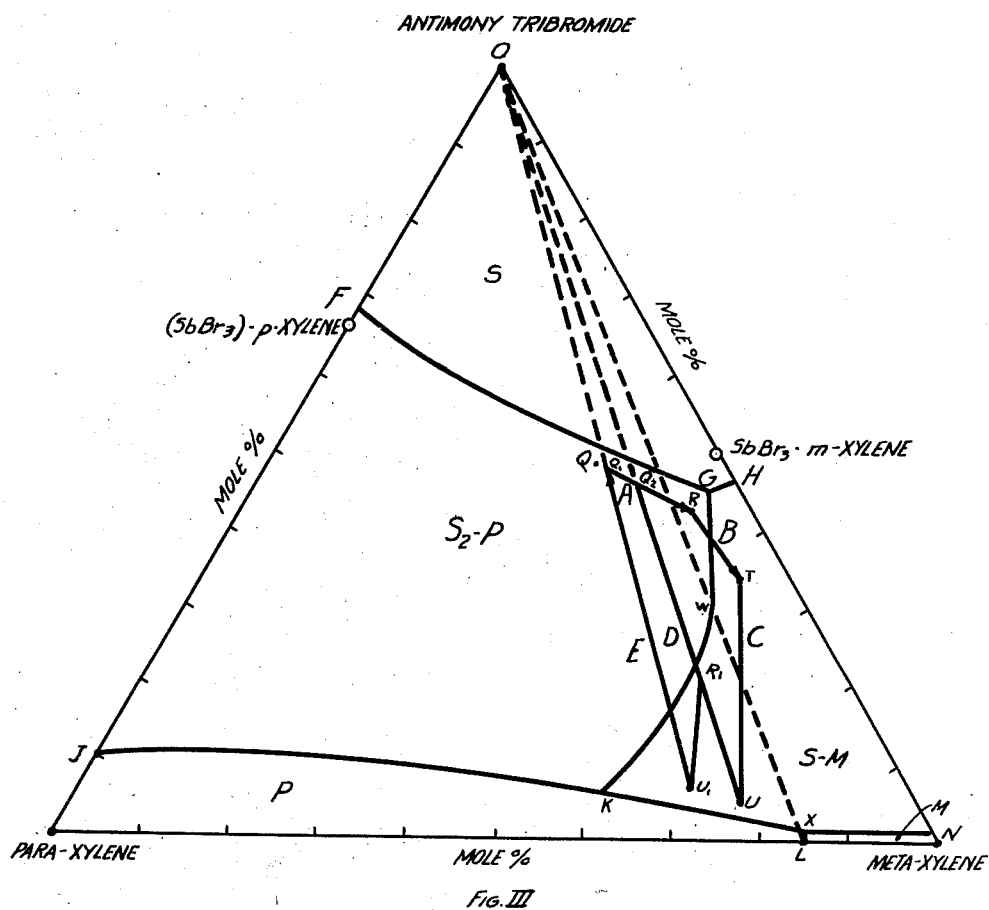
Fig. III
LINE A: $(SbBr_3)_2$ p-XYLENE COOLING STEP
LINE B: REMOVAL OF $SbBr_3$
LINE C: $SbBr_3$ · m-XYLENE COOLING STEP
LINE D: RECYCLE OF MOTHER LIQUOR
LINE E: RECYCLE OF MOTHER LIQUOR
Inventors:
Alan C. Nixon
Carl H. Deal Jr.
By Their Attorney:

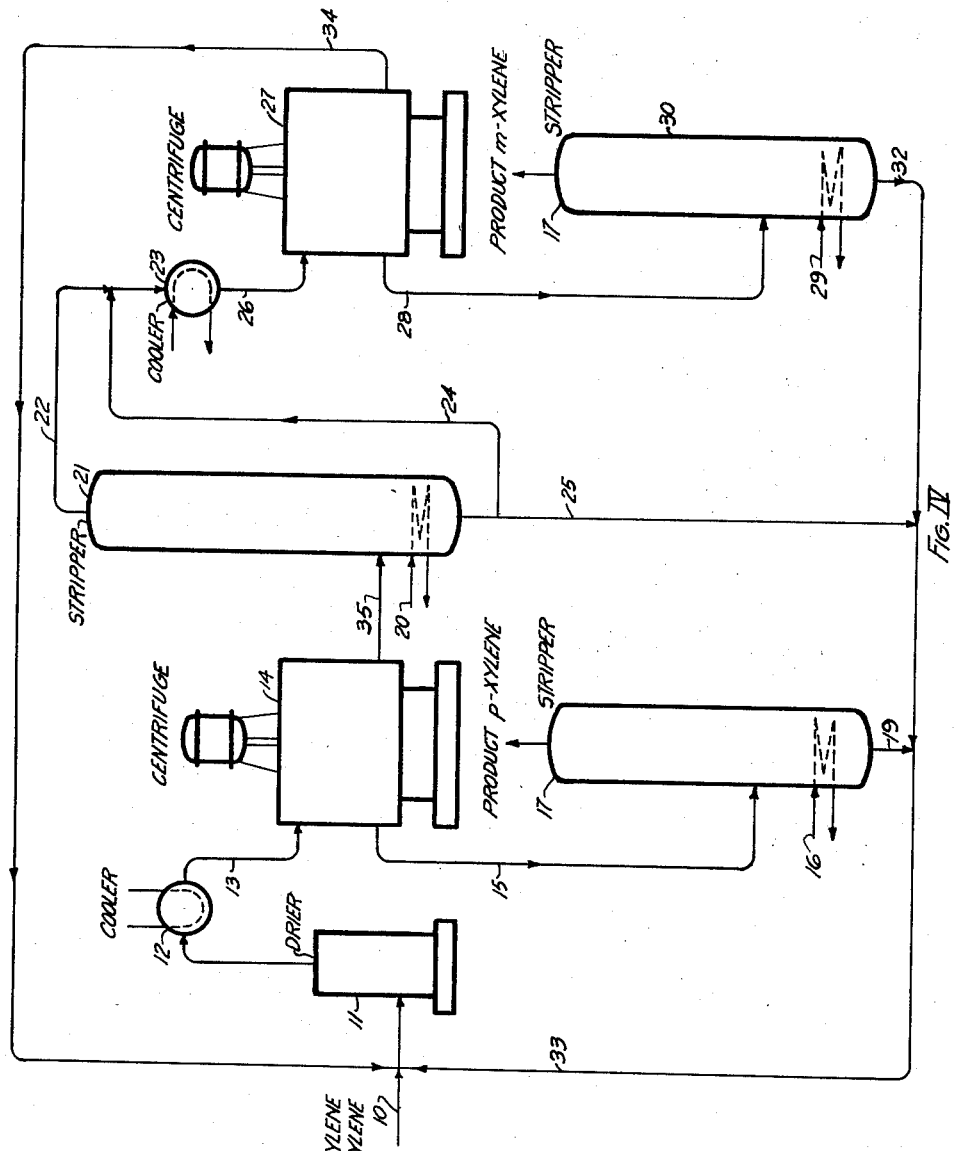

2,768,220

SEPARATION OF C₈ AROMATIC COMPOUNDS BY FORMING COMPLEXES WITH ANTIMONY TRIBROMIDE

Alan C. Nixon, Kensington District, Contra Costa County, and Carl H. Deal, Jr., Orinda, Calif., assignors to Shell Development Company, New York, N. Y., a corporation of Delaware Application September 13, 1954, Serial No. 455,493

9 Claims. (Cl. 260—674)

This invention relates to a method for the separation of mixtures of organic compounds, and more particularly pertains to the separation of mixtures of hydrocarbons by crystallization. More specifically, the invention is concerned with the separation of mixtures of isomeric aromatic compounds, e. g. aromatic hydrocarbons, by a selected method involving selective crystallization of one of the isomers. One aspect of the invention relates to the separation and purification by selective crystallization of a disubstituted benzene compound from mixtures thereof with other aromatic compounds isomeric therewith, such as the separation of meta-xylene and para-xylene from a mixture thereof.

Mixtures of certain aromatic compounds, such as benzene, alkyl benzenes (toluene, xylenes, etc.), hydroxylbenzenes (phenol, etc.), and hydroxy-alkyl-benzenes (cresols, xylenols, etc.), are produced as by-products from the coking of coal and also from certain petroleum conversion and separation processes. Mixtures of still other aromatic compounds, such as the nuclear-halogenated derivatives of benzene, toluene, and the like, are produced by suitable halogenation reactions of the corresponding aromatic compound, as well as alkylation, for example, of halogenated benzene derivatives. Mixtures of isomeric nitro-aromatic compounds are obtained by nitration of aromatics, such as mixtures of isomeric nitrotoluenes by the nitration of toluene; reduction of the nitro groups yields mixtures of aromatic amines, such as the toluidines.

Various methods have been proposed for effecting at least partial separations as applied to mixtures of the type indicated above. Where there is a sufficient difference in the boiling points of some of the constituents of the given mixtures, the separation is effected by fractional distillations. Thus, ortho-xylene (B. P., 144.4° C. at atmospheric pressure) can be readily separated from a mixture containing it and ethyl benzene (boiling point, 136.2° C.) and the meta- and para-xylenes (boiling points, 139.3° C. and 138.5° C., respectively) by fractional distillation. However, a mixture of ethyl-benzene and meta- and para-xylenes cannot be effectively separated by such a method.

Separations by fractional crystallization have been utilized in some cases; but in general eutectic mixtures are formed after only partial separation of one of the constituents, thus making it possible to obtain only one of the constituents in any substantial degree of purity while not obtaining any of them in a separated form in sufficiently high yields.

In still other cases, particularly in the case of highly polar substituted derivatives, such as the phenolic substances, separations have been effected by first subjecting the mixture to chemical conversion, such as sulfonation, alkylation, etc., followed by separation of the resulting mixture of new derivatives, and then reconversion of the separated substances such as by desulfonation, dealkylation, etc., to the original substances.

In general, however, the methods heretofore available have not been entirely satisfactory for the separation and recovery of isomeric aromatic compounds.

It is, therefore, a principal object of the present invention to provide an efficient and economic process for the separation of mixtures of organic compounds, particularly closely related compounds. A further object is to provide a method for the separation and recovery of one aromatic compound from a mixture thereof with a closely related aromatic compound. A still further object is the separation and recovery of pure components from a mixture of C₈ aromatics, especially the C₈ aromatics boiling below about 144° C. Another object is concerned with the separation and recovery of para- and meta-xylenes from a mixture comprised substantially of para- and meta-xylenes. Still another object is to provide a method involving crystallization whereby both substantially pure para-xylene and substantially pure meta-xylene may be obtained from a mixture of the two or from commercial mixtures containing them, and whereby good yields of both may be secured.

The above-mentioned objects of the invention and the method of attaining them as well as other objects will be more fully understood and will become apparent from the description of the invention as given hereinafter.

The term "xylene," as used herein, includes ethyl benzene as well as ortho-, meta-, and para-xylenes, and only these.

In accordance with the present invention, it has now been found that mixtures of ethyl benzene, meta-xylene and para-xylene can be separated into component parts thereof by admixing such mixtures with antimony tribromide and cooling to fractionally crystallize from the resulting mixture a single molecular component thereof as a solid phase complex with antimony tribromide.

Described broadly, the invention is a process of separating substantially pure component substances from a mixture consisting essentially of ethyl benzene, meta-xylene and para-xylene, or any two of these, by admixing said mixture with antimony tribromide and cooling the resulting mixture to solidify only one of the components, substantially as a pure compound, in the form of a solid phase complex with antimony tribromide. The invention also contemplates, as a part of sequence of operations, the steps of removing a portion or all of the antimony tribromide from the resulting solution after the separation of the aforementioned complex, cooling the thereby resulting solution, crystallizing therefrom a different component substantially as a pure compound alone, or in the form of a solid phase complex with antimony tribromide.

The invention also includes a process of separating as substantially pure substances, components from a mixture consisting essentially of ethyl benzene, meta-xylene and para-xylene, or any two of these, which comprises forming a liquid solution of antimony tribromide with said mixture, cooling the resulting solution to precipitate only one of the components, substantially as a pure compound, in the form of a solid phase complex with antimony tribromide, thereby causing a corresponding change in the composition of the mother-liquor as a result of the separation of the solid phase complex, further cooling said mother liquor so as to cause its composition to change to a point just short of its eutectic composition, thereupon after separation of said solid phase complex from the mother liquor, changing the concentration of antimony tribromide in the resulting mother liquor so as to change its composition to such an extent that, when the mother liquor is cooled again, another component separates out as a substantially pure compound in the form of a solid phase complex with antimony tribromide before the eutectic line is reached again due to the constantly changing mother liquor composition as the solid phase complex separates.

Having described the invention in its broader aspect or scope, it will now be described in greater detail both as applied broadly and as applied to a more specific embodiment thereof, the description being made with reference to the accompanying drawings which are made a part of the specification and wherein:

Figure I shows the temperature-composition, liquid-solid phase diagrams on a mol-percent basis of the three 3-component systems of antimony tribromide with meta-xylene and para-xylene, antimony tribromide with meta-xylene and ethylbenzene and antimony tribromide with para-xylene and ethylbenzene and wherein are indicated regions and the solid phase which can coexist with the liquid phase therein, and also the temperature to which any liquid mixture of these components must be reduced to form a solid phase.

Figure II is a liquid-solid phase diagram on a mol-percent basis of the antimony tribromide, ethylbenzene, meta-xylene and para-xylene system, wherein eutectic lines on antimony tribromide isoplethic planes are projected from the antimony tribromide apex onto the ethylbenzene, meta-xylene and para-xylene plane.

Figures I and II, in combination, precisely define the structure of the quaternary phase diagram (a regular tetrahedron) of the system: antimony tribromide, ethylbenzene, meta-xylene and para-xylene.

Figure III is a diagrammatic representation on a mol percent basis of the various eutectic relationships of the system, antimony tribromide, meta-xylene and para-xylene, wherein eutectic lines are shown as indicated and lines representing the different combinations of steps in applications thereof to an embodiment of the invention are shown in their relationships to the eutectic lines; and Figure IV is a process flow diagram of one embodiment of the invention as applied to the separation and recovery of both para-xylene and meta-xylene from a mixture thereof.

Antimony tribromide is known to form complexes with various aromatic compounds, as for example, ortho-, meta- and para-xylenes, ethyl-, propyl- and amyl-benzenes, diphenyl, phenol, phenetole, anisole, benzaldehyde, benzonitrile, cyclohexane, p-cymene, benzene, toluene, ortho- and para-nitrotoluene, mesitylene, naphthalene, pseudocumene, diphenylmethane, acetophenone, benzophenone, and their corresponding 2-component, solid-liquid phase relationships with antimony tribromide may readily be found in the literature. It might be expected from such facts that mixtures of such related materials, as the xylenes, would lead to a very complex system when mixed with antimony tribromide; such, indeed, is the case, but nevertheless, in spite of this, it has been found that such a system may be so handled as to effect a separation of the components.

With reference to Figure I, which shows in a part thereof the temperature-composition, 3-component, liquid-solid phase diagram of meta-xylene and para-xylene when dissolved in various amounts of antimony tribromide, it will be observed that there is an effective and significant change in the ratio of the meta-xylene to para-xylene content of the eutectic composition which ratio varies with the antimony bromide concentration, as represented by line G—K, as compared with that ratio of the meta-xylene to para-xylene which is present in the eutectic composition in the absence of antimony tribromide, as represented by point L on the para-xylene, meta-xylene line (see Figure III for points G, K and L). Similarly, the other two ternary phase diagrams of Figure I also show the displacement of the eutectic ratios of the aromatics in the presence of antimony tribromide.

In Figure II, points on the phase boundaries in the quaternary system along with corresponding points in the ternary systems are plotted in the three component diagram on an antimony tribromide-free basis to give the curves shown. Each one of this family of curves represents the intersection of the phase bounding surface in the quaternary space with a plane of constant antimony tribromide concentration, the intersection having been projected from its appropriate position in the triangular pyramid representing the quaternary space onto the ethylbenzene:meta-xylene:para-xylene base from the opposing apex of the pyramid. The dashed line represents approximately the farthest extension of the para-xylene complex region toward the opposing side of the triangle (ethylbenzene:meta-xylene) regardless of the antimony tribromide concentration. It corresponds to about 46 mol percent antimony tribromide on the ethylbenzene: para-xylene end to about 38 mol percent antimony tribromide on the meta-xylene:para-xylene end. In the case of the 50 mol percent antimony tribromide curve the two phase regions are the para-xylene complex with antimony tribromide and antimony tribromide itself. In all other cases, the curves connecting points on the para-xylene: ethylbenzene base and the para-xylene:meta-xylene base of the diagram represent the phase boundaries between the para-xylene complex and the other complexes, the meta-xylene complex on the one hand the ethylbenzene complex on the other. The lines connecting these curves with the ethylbenzene:meta-xylene base of the diagram are the phase boundaries separating the ethylbenzene and meta-xylene complexes.

Referring now to Figure III which is exemplary of the three 3-component phase diagrams of Figure I, there are five regions in the diagram characterized by the solid phase which can coexist with liquid phase. In region S, the solid is antimony tribromide; in region $S_2$–P, the solid is the antimony tribromide:para-xylene complex which contains two mols of antimony tribromide to one mol of para-xylene $(SbBr_3)_2 \cdot p\text{-}C_6H_4(CH_3)_2$; in region S–M, the solid is the antimony tribromide:meta-xylene complex which contains one mol of antimony tribromide to one mol of meta-xylene $(SbBr_3) \cdot m = C_6H_4(CH_3)_2$. It should be observed that the significant behavior in this system is depicted in the angle of the eutectic line GK separating the regions S–M and $S_2$–P. This line becomes closer to the para-xylene apex as the antimony tribromide concentration is reduced. The significance of the relationships which exist as represented by line GK (points G and K correspond to about 5% and 35% by weight para-xylene, respectively, on a xylene basis), and how these relationships are utilized in the present invention may be clarified further by an examination of the actual situation as represented by line GK and the hypothetical line LO drawn from the simple para-xylene-meta-xylene eutectic point to the point of pure antimony tribromide. The point L corresponds to the eutectic composition of an antimony tribromide-free mixture of meta- and para-xylenes, that is, about 88% meta-xylene and 12% para-xylene or a ratio of about 7:1 of meta- to para-xylene. The ratio of meta-xylene to para-xylene is the same value (about 7:1) at every point on the line LO. In other words, if the antimony tribromide functioned solely as an inert diluent when admixed with a mixture of meta- and para-xylenes, the eutectic compositions obtainable therefrom would all have the same ratios of meta- to para-xylene. Contrary thereto, the intersection of lines GK and LO at W shows that there is only one antimony tribromide concentration at which the net result is equivalent to what it would be if the antimony tribromide were an inert diluent. At higher concentrations of antimony tribromide the ratio of meta-xylene to para-xylene in the eutectic composition (both in solid state as well as in the remaining liquid phase) is greater than the 7 to 1 ratio of the normal eutectic, while at lower concentrations the proportion of para-xylene in the eutectic composition (based on total meta- and para-xylenes) increases and reaches a value of about 35% at K. It is also pointed out that point X on line LX which separates the para- and meta-xylene regions corresponds to about 15% para-xylene on a xylene basis.

A specific application of the invention is clearly set forth with reference to the above-referred figure (Figure III). Here the eutectic lines of the system antimony tribromide:meta-xylene:para-xylene have been reproduced, and three lines representing three steps of an application of the invention have been drawn thereon. The first step represented by line A is that of crystallizing and separating the antimony tribromide:para-xylene complex (S₂–P) by cooling a liquid phase mixture having the composition represented by point Q; the second step, represented by line B is that of reducing the antimony tribromide concentration of the separated liquid phase; the third step, represented by line C is that of crystallizing and separating the antimony tribromide:meta-xylene complex (SM).

Thus, still referring to Figure III, when a liquid mixture of such composition as represented by the point Q, is cooled, not only does a change in temperature of the system take place but also, due to this lowering of the temperature, solidification and separation of a solid phase complex composed of two mols of antimony tribromide to one mol of para-xylene occurs. As a result of the separation of this solid phase complex the composition of the liquid mixture progressively changes, diminishing in the proportions of antimony bromide and of para-xylene contained therein. This change in composition and lowering of temperature takes place until the liquid mixture reaches a composition represented by point R. Point R is located close to or on the eutectic line, GK. The chilling operation preferably is controlled and stopped somewhat short of the eutectic line so as to insure high purity of the solid phase, para-xylene complex, without risking contamination thereof with meta-xylene, which would occur if the cooling were continued for such a time as to cause some solidification after the composition of the solution had reached that represented by the eutectic line. The eutectic line represents those compositions of the mixture from which it is not possible to separate out a solid phase containing antimony tribromide as a complex with only one of the organic components therein by a decrease in temperature.

From the above application it is obvious that the separation of one of the components of a mixture to be separated as a solid phase complex with antimony tribromide is possible provided, of course, that the composition of the solution does not correspond to any point on a eutectic line of the system. The recovery of the para- or meta-xylene or any other organic compound from its corresponding solid phase complex with the antimony tribromide is readily effected, as will be understood by one skilled in the art. For example, para-xylene may be readily separated from antimony tribromide with which it occurs as a solid phase complex by heating and distillation, the xylene being easily distilled from the antimony tribromide and antimony tribromide removed therefrom. The removal of antimony tribromide from the separated liquid composition represented by point R, to effect the change in composition as indicated by line B, may be accomplished by various methods, as, for example, by distillation the composition of reduced antimony tribromide content being separated as a distillate. As a result of the partial removal of antimony tribromide the composition of the solution will change to a composition such as is represented by point T.

It should be noted that the composition of the solution resulting from the removal of antimony bromide will be somewhat along a line drawn through point R and that point of the three phase diagram, which represents 100% antimony tribromide. Since antimony tribromide is being removed, the new resulting composition of the solution will be represented by a point on this line in the direction of diminishing antimony tribromide content.

After the composition of the solution has been changed by the removal of antimony tribromide so as to reach some composition represented by point T, it should be noted that the solution represented by such a point T can have in equilibrium with it, at a selected temperature, a solid phase complex composed of one mol of antimony tribromide to one mol of meta-xylene. When the liquid mixture of composition T is cooled not only does a change in temperature of the system take place but also, due to this lowering of the temperature, solidification and separation of solid phase antimony tribromide:meta-xylene complex (S–M) occurs. As a result of the separation of this solid phase complex the composition of the solution progressively changes, diminishing in the proportions of antimony tribromide and meta-xylene present. As the cooling continues the change in composition takes place until a composition represented by point U or thereabout is reached. Point U is located close to the indicated eutectic line, the cooling operation being controlled and stopped somewhat short thereof so as to insure high purity of the solid phase meta-xylene complex without risking contamination thereof with para-xylene.

From the above (i. e., cooling the solution from composition T to composition U) it is obvious that it is possible to separate meta-xylene as a solid phase complex with antimony tribromide in a similar manner starting with any composition, such as is represented by point T, which lies within the S–M region.

It should be noted that the mother liquor of composition U remaining after the separation of the solid phase complex of meta-xylene with antimony tribromide, may be returned to the process at any suitable point depending upon the operating conditions. Likewise, the recycle of antimony tribromide, recovered from the separation of the organic compounds from the solid phase complexes and/or from the operation wherein antimony tribromide is removed from the mixture to be separated (i. e., going from point R to T) may be returned to the process at any suitable point depending upon the operating conditions. The method and manner of recycling the above materials to the best advantage will readily be apparent to one skilled in the art.

For an important application of the process of the invention as described hereinbefore, reference is now made to Figure IV. Figure IV is a process flow sheet showing the application of the invention to the separation of meta-xylene and para-xylene from mixtures thereof. For the sake of simplicity and in order that the process may be more readily understood, various storage tanks, pumps, instruments, service accessories, etc., have been omitted from the drawing since the proper use of these devices will be obvious to one skilled in the art. It will be understood that the incorporation of the various numerical values into the description of the operations is made solely for the purpose of illustration and clarification and that various modifications may be readily made, as will be understood from the foregoing description of the invention.

A representative feed stock of xylenes utilized in the process indicated by Figure IV has the following approximate composition, expressed as mol percent: para-xylene, 23%; meta-xylene, 77%; for isomeric materials mol percent is the same as weight percent. To about 100 mols of this mixture of xylenes are added about 100 mols of antimony tribromide. The resulting mixture is introduced by means of line 10 into a suitable drier 11. The dried mixture is then chilled in a suitable cooler 12 to a temperature of about 14° C. with the formation of a precipitate, consisting of the solid phase complex of antimony tribromide and para-xylene, (S₂–P) said complex containing two mols of antimony tribromide per mol of para-xylene. The resultant slurry from cooler 12 is transferred by means of line 13 to centrifuge 14, wherein the solid phase is separated from the mother liquor. The solid may be washed in the centrifuge with a small amount of para-xylene to remove adherent meta-xylene, the washings being added to the mother liquor or collected separately and recycled for admixing with the feed. The separated solid complex amounting to about 13.8 mols of para-xylene and 27.7 mols of antimony tribromide is discharged from the centrifuge and transferred to a stripper 17 by transfer means 15, stripper 17 being heated by indirect heating means 16 employing any suitable heating medium. The solid complex is melted in stripper 17 (melting point about 68° C.) and at the appropriate temperature, pure para-xylene, amounting to 13.8 mols or 60% of the original amount in the initial feed, free of meta-xylene, is removed as distillate from the top of the stripper 17 and is collected as product para-xylene. The bottoms in the stripper 17 will be antimony tribromide amounting to 27.7 mols and may be removed by means 19. The stripper 17 may be operated, if desired, to recover any portion of the para-xylene as product, the remainder being recycled with the antimony tribromide.

The mother liquor resulting from the separation of the para-xylene solid phase complex and now containing about 9.2 mols of para-xylene, 77 mols of meta-xylene and 72.3 mols of antimony tribromide is transferred from centrifuge 14 by transfer means 35 to a stripper 21 which is heated by indirect heating means 20, employing a suitable heating medium, such as superheated steam. Therein, the mother liquor is partially separated into its constituents, namely, a mixture of para-xylene and meta-xylene as distillate from the top of the stripper and antimony tribromide from the bottom. To the distillate mixture of the para- and meta-xylenes in line 22 is added, by means of line 24, a portion of the antimony tribromide, amounting to about 50 moles, withdrawn from stripper 21 by means 25. The remainder of the antimony tribromide is recycled to the first step of the process. The resulting mixture of para- and meta-xylenes and antimony tribromide in line 22, amounting to 9.2, 77 and 50 mols, respectively, is chilled indirectly in a suitable cooler 23 to a temperature of about —32° C. to yield a precipitate consisting of the solid phase complex of antimony tribromide and meta-xylene (S–M) said complex containing one mol of antimony tribromide per mol of meta-xylene. The resultant slurry from cooler 23 is transferred by transfer means 26 to centrifuge 27 wherein the solid and liquid phases are separated. The solid may be washed in the centrifuge with a small amount of meta-xylene. The separated solid complex amounting to 48 mols of meta-xylene and 48 mols of antimony tribromide is then removed from the centrifuge and transferred by means of line 28 to stripper 30; stripper 30 is heated by indirect heating means 29 employing any suitable heating medium, such as superheated steam. The solid complex is melted (M. P. about 19° C.) and at the appropriate temperature pure meta-xylene amounting to 48 mols or 62% of the original amount in the initial feed, free of para-xylene, is distilled overhead and is collected as a distillate product. Meta-xylene is withdrawn as bottoms from stripper 30, by means of line 32 and recycled to the first stage of the process. The mother liquor resulting from the separation of the meta-xylene solid phase complex and containing about 9.2 mols of para-xylene, 29 mols of meta-xylene (a ratio of meta- to para-xylene of about 3 to 1 or about one-half that of the normal meta-, para-xylene eutectic) and 2 mols of antimony tribromide, and which may be represented by point U in Figure III, may be removed from centrifuge 27 and transferred by means 34 as recycle material to be used with fresh feed containing a mixture of para- and meta-xylenes, just as the antimony tribromide bottoms of stripper 17, 21 and 30 may be removed by means 19, 25 and 32, respectively, and transferred by means 33 as recycle material to be used with fresh feed containing a mixture of para- and meta-xylenes.

Instead of recycling the separated mother liquor of composition U in line 34 back to be mixed with fresh xylene feed stock, if desired, antimony tribromide may be added thereto to change the composition thereof to that corresponding to some point along line D (Figure III), such as that of point $Q_2$ on line A, after which it may be subjected to the previously described sequence of operational steps.

Alternatively, antimony tribromide may be added to change the composition to a value still in the S–M region, such as represented by point $R_1$, after which a further amount of solid phase S–M is produced by cooling, until the mother liquor has the composition of point $U_1$, which has about the same ratio of meta- to para-xylenes as the initial feed stock and can be recycled thereto without affecting the ratio of the xylenes, as is clear from line E ending at point $Q_1$.

In the foregoing described process, the chilling operations were carried out so as to cause the composition of the solutions to approach the corresponding eutectic compositions but were stopped somewhat short thereof so as to insure high purities of the solid phases and to avoid contaminations thereof with the other xylene isomer. It is to be understood, of course, that in any operation of partial crystallization, centrifugation, etc., the separated solid phase may be subjected to suitable washing operations to remove adherent materials which may be considered as impurities to the solid phase.

In view of the foregoing description, it is to be seen that, with a slight sacrifice in purity, in general the cooling and fractional solidification of the solid phase which contains only one of the xylene isomers may be continued until a eutectic composition is reached, that is, a condition is reached at which it is no longer possible to separate out only one organic component as a solid phase complex with antimony tribromide, after which the antimony tribromide content of the separated mother liquor is changed substantially, as by adding or removing antimony tribromide to shift the composition to a value such that upon cooling a complex of antimony tribromide and one of the xylene isomers, preferably the other xylene isomer, separates as solid phase. Thereafter, such second solid phase complex is caused to separate, by cooling the mixture, until a eutectic composition is again reached. If desired such operations may be repeated a number of times in various sequential orders. Also, it may be found to be desirable in some instances to combine with one or more crystallization steps as described hereinbefore, a step of fractional crystallization of one of the xylenes from the simple mixture of isomeric materials, such as para-xylene from a mixture of para- and meta-xylenes, in the absence of antimony tribromide, although in general this has the disadvantage of requiring lower temperatures.

From the foregoing explanations and description it is seen that it is possible to separate para- and/or meta-xylene from mixtures of the same by selective crystallization of a solid phase complex with antimony tribromide, which is a preferred variation of the invention. Likewise, with reference to Figure I, it is possible, by applying precisely the same methods, to separate meta-xylene and/or ethylbenzene from mixtures of the same and also to separate para-xylene and/or ethylbenzene from mixtures of the same.

Furthermore, referring now to Figures I and II, it is also possible to separate meta-xylene, para-xylene and ethylbenzene from mixtures containing these three components by fractional crystallization with antimony tribromide. The quaternary phase diagram (a regular tetrahedron) which is defined by Figures I and II consists of several regions which determine the composition of the solid phase which is obtained upon cooling a mixture of antimony tribromide, para-xylene, meta-xylene and ethyl benzene, or any combination of these compounds. It will be noted that these regions are three-dimensional in the case of the four-component system and two-dimensional in the case of any of the three-component systems. In each case there are both complex regions (antimony tribromide with one of the xylenes) and pure compound regions. It is possible to trace the path of the composition of the liquid and solid phases obtained in the process of the invention within this quaternary phase diagram, whether one is concerned with a three- or a four-component system.

Also, regardless of whether the xylene mixture to be separated contains two or three xylenes, cooling an admixture of this mixture with a quantity of antimony tribromide sufficient to bring the composition of the admixture within an antimony tribromide:xylene complex region will result in the precipitation of the complex pertaining to this region, and the composition of the mother liquor will change along a straight line from the composition of the complex through the composition of the admixture and in a direction away from the composition of the complex, until a phase boundary (eutectic mixture) is encountered. Only one of such cooling steps is essential when only one component is desired to be separated in a pure form. However, it is of course also possible, as described above in the case of the meta- and para-xylenes separation, to increase the recovery of any such one desired pure xylene from a three component mixture by altering the proportion of antimony tribromide in the resulting mother liquor obtained at the termination of the first cooling step (preferably when the composition of the mother liquor is just short of a phase boundary) in such a manner as to bring the composition of the thusly-formed second admixture back into the interior of the same complex region of the first cooling step, and then repeating the operations. Reference to the phase diagram will determine whether antimony tribromide must be added to or removed from the first mother liquor.

Alternatively or additionally, it is also possible to separate two or three xylenes from a mixture of ethyl benzene, meta-xylene, and para-xylene, by selecting the proportion of antimony tribromide to be added to the mixture such that the resulting admixture will be not only within a complex region of the phase diagram, but also within an area such that at the termination of the first cooling step near a phase boundary, the composition of the mother liquor can be brought into a different complex region by the adjustment of the concentration of antimony tribromide therein. Again, the phase diagram determines whether antimony tribromide must be added to or removed from the mother liquor to do this. Then, after this adjustment of the antimony tribromide concentrations the resulting second admixture is cooled and a solid phase complex is obtained containing only antimony tribromide and a second xylene. Similarly, the process can be continued to recover a greater amount of this second xylene by adjusting the concentration of the second mother liquor so that it will be in the same complex region but further removed from a phase boundary and/or to recover the third component by adjusting the concentration of antimony tribromide to bring the composition of the mother liquor into the third complex region of the phase diagram.

The quaternary phase diagram, as defined by Figures I and II, being applicable to both two and three component xylene mixtures admixed with antimony tribromide, is at the same time both the most accurate and the most convenient means by which the process of the invention can be defined.

It will be noted that in every case, whether the starting mixture contains only two, or all three of the components ethyl benzene, meta-xylene and para-xylene, and whether only one pure component is desired therefrom, or two, or all three, the crystallization of the mixture in the presence of a proper amount of antimony tribromide according to the present invention will result in high recoveries of the desired products and without the excessively low temperatures which would be required in a conventional crystallization process.

In the processes described herein there may be admixed with the components to be separated minor amounts, say up to about 40% by weight, but preferably not more than 10% by weight of ortho-xylene along with any other of the various organic compounds normally associated with commercial xylene. Likewise, the feed containing the components to be separated may contain even major amounts of various paraffin hydrocarbons since in general the paraffin hydrocarbons act only as a diluting agent. Thus, for example, the incorporation of light paraffin hydrocarbons, such as, isopentane, raises the temperature at which the solid phases are formed, reducing the refrigerating requirements of the process. In addition also there may be added to the components to be separated minor amounts of corrosion inhibitors and stabilizers for antimony tribromide.

The present application is a continuation-in-part of our copending application Serial No. 153,252, filed March 31, 1950, now abandoned.

We claim as our invention:

1. The method of separating a substantially pure $C_8$ aromatic hydrocarbon from a mixture consisting essentially of substantial proportions each of at least two isomeric $C_8$ aromatic hydrocarbons boiling below 144° C., said mixture containing from 5% to 40% of para-xylene on the basis of such aromatic hydrocarbons, which comprises forming an admixture of said mixture with antimony tribromide, the amount of antimony tribromide and the composition of said mixture being such that the composition of said admixture lies in an antimony tribromide:$C_8$ aromatic hydrocarbon complex region of the quaternary phase diagram defined in Figures I and II, in which, upon cooling said admixture, a solid phase complex of antimony tribromide with only one of said isomeric $C_8$ aromatic hydrocarbons is produced; cooling said admixture to produce a substantial quantity of only said solid phase complex and a remaining mother liquor containing antimony tribromide and some of said one $C_8$ aromatic hydrocarbon and being enriched in other of said isomeric $C_8$ aromatic hydrocarbons; separating said solid phase complex from said mother liquor; and recovering the substantially pure $C_8$ aromatic hydrocarbon from said solid phase complex.

2. The method of claim 1 wherein a second admixture is formed by altering the proportion of antimony tribromide in the resulting mother liquor to an extent and in a direction such that the composition of said second admixture lies in the same antimony tribromide:$C_8$ aromatic hydrocarbon complex region of the phase diagram defined by Figures I and II but further removed from a phase boundary of said phase diagram than said remaining mother liquor; wherein said second admixture is cooled to form an additional substantial quantity of only said solid phase complex and a second remaining mother liquor; wherein said additional solid phase complex is separated from said second remaining mother liquor; and wherein an additional quantity of the substantially pure $C_8$ aromatic hydrocarbon is recovered from said additional solid phase complex.

3. The method in accordance with claim 1 wherein the amount of antimony tribromide added to the mixture of isomeric $C_8$ aromatic hydrocarbons boiling below 144° C. and the composition of said mixture are such that the composition of the resulting admixture is also in a region of the quaternary phase diagram defined by Figures I and II wherein a straight line from the composition of the solid phase complex which is produced upon cooling said admixture, through the composition of said admixture, passes through a point which is within the same antimony tribromide:$C_8$ aromatic hydrocarbon complex region, which is also just short of a first-encountered phase boundary, and which is also located such that another straight line from said point to the antimony tribromide apex of said phase diagram will pass from said one antimony tribromide:$C_8$ aromatic hydrocarbon complex region into another antimony tribromide:$C_8$ aromatic hydrocarbon complex region of said phase diagram.

4. The method of separating two substantially pure isomeric $C_8$ aromatic hydrocarbons from a mixture consisting essentially of substantial proportions each of at least two isomeric $C_8$ aromatic hydrocarbons boiling below 144° C., said mixture containing from 5% to 40% of para-xylene on the basis of such aromatic hydrocarbons, which comprises: (1) forming a first admixture of said mixture with antimony tribromide, the amount of antimony tribromide and the composition of said mixture being such that the composition of said first admixture lies in an antimony tribromide:$C_8$ aromatic hydrocarbon complex region of the quaternary phase diagram defined by Figures I and II, in which, upon cooling said admixture, a solid phase complex (A) of antimony tribromide with only one of said isomeric $C_8$ aromatic hydrocarbons is produced, and which composition at the same time lies in a region of said phase diagram wherein a straight line from the composition of said solid phase complex (A), through the composition of said admixture, passes through a point which is within the same antimony tribromide:$C_8$ aromatic hydrocarbon complex region, which is also just short of a first-encountered phase boundary, and which is also located such that another straight line from said point to the antimony tribromide apex of said phase diagram will pass from said one antimony tribromide:$C_8$ aromatic hydrocarbon complex region into another antimony tribromide:$C_8$ aromatic hydrocarbon complex region of said phase diagram; (2) cooling said admixture to produce a substantial quantity of only said solid phase complex (A); (3) separating said solid phase complex (A) from a resulting first mother liquor containing antimony tribromide and some of said one $C_8$ aromatic hydrocarbon and being enriched in other of said isomeric $C_8$ aromatic hydrocarbons; (4) altering the proportion of antimony tribromide in said first mother liquor to produce a second admixture the composition of which lies in another antimony tribromide:$C_8$ aromatic hydrocarbon complex region of said phase diagram; (5) cooling said second admixture to produce a substantial quantity of only a solid phase complex (B) of antimony tribromide with another of said isomeric $C_8$ aromatic hydrocarbons; (6) separating said complex (B) from a resulting second mother liquor; and (7) recovering a substantially pure $C_8$ aromatic hydrocarbon from each of said solid phase complexes (A) and (B).

5. The method of separating, in a substantially pure form, each of substantial proportions each of two isomeric $C_8$ aromatic hydrocarbons boiling below 144° C. from a mixture consisting essentially thereof and containing from 5% to 40% of para-xylene on the basis of such aromatic hydrocarbons, which comprises: (1) forming a first admixture of said mixture with antimony tribromide, the amount of antimony tribromide and the composition of said mixture being such that the composition of said first admixture lies within one of the two antimony tribromide:$C_8$ aromatic hydrocarbon complex areas of the ternary phase diagram of Figure I pertaining to said mixture, in which, upon cooling said first admixture, a solid phase complex (A) of antimony tribromide with only one of said isomeric $C_8$ aromatic hydrocarbons is produced, and at the same time within the area of said phase diagram wherein a straight line from the composition of said solid phase complex (A), through the composition of said first admixture, passes through a point which is within the same antimony tribromide:$C_8$ aromatic hydrocarbon complex area, which is also just short of a first-encountered phase boundary, and which is also located such that another straight line from said point to the antimony tribromide apex of said phase diagram will pass from said one antimony tribromide:$C_8$ aromatic hydrocarbon complex area into the other antimony tribromide:$C_8$ aromatic hydrocarbon complex area of said phase diagram; (2) cooling said admixture to produce a substantial quantity of said solid phase complex (A); (3) separating said solid phase complex (A) from a resulting first mother liquor containing antimony tribromide and some of said one $C_8$ aromatic hydrocarbon and being enriched in the other one of said isomeric $C_8$ aromatic hydrocarbons; (4) altering the proportion of antimony tribromide in said first mother liquor to produce a second admixture the composition of which lies in the other antimony tribromide:$C_8$ aromatic hydrocarbon complex region of said phase diagram; (5) cooling said second admixture to produce a substantial quantity of a solid phase complex (B) of antimony tribromide with the other of said isomeric $C_8$ aromatic hydrocarbons; (6) separating said complex (B) from a resulting second mother liquor; (7) recovering a substantially pure $C_8$ aromatic hydrocarbon from each of said separated solid phase complexes (A) and (B); and (8) recycling the resulting recovered antimony tribromide for further utility in preceding operations of the process.

6. The method of claim 5 wherein the two isomeric $C_8$ aromatic hydrocarbons are para-xylene and meta-xylene.

7. The method of claim 5 wherein the two isomeric $C_8$ aromatic hydrocarbons are ethyl benzene and para-xylene.

8. The method of separating substantially pure para-xylene and substantially pure meta-xylene from a mixture consisting essentially of para-xylene and meta-xylene and containing from about 15% to about 35% para-xylene, which comprises: (1) forming a liquid admixture of said mixture with a substantial proportion of antimony tribromide to produce an admixture from which a solid phase complex (A) containing only antimony tribromide and only a first one of said xylenes is first produced on cooling; (2) cooling said admixture to produce a substantial proportion of only said solid complex (A); (3) separating said solid complex (A) from a resulting first mother liquor containing antimony tribromide and some of said xylenes and being enriched in the other one of said xylenes; (4) altering the proportion of antimony tribromide in said first mother liquor, decreasing it when said solid complex (A) is a complex of antimony tribromide and para-xylene and increasing it when said solid complex (A) is a complex of antimony tribromide and meta-xylene, to produce an admixture from which a solid phase complex (B) containing only antimony tribromide and only the other one of said xylenes is first produced on cooling; (5) cooling said admixture to produce a substantial proportion of only said solid complex (B); (6) separating said solid complex (B) from a second mother liquor; (7) recovering substantially pure para-xylene from one of said separated solid phase complexes (A) and (B) and substantially pure meta-xylene from the other one of the complexes (A) and (B); and (8) recycling the resulting recovered antimony tribromide for further utility in preceding operations of the process.

9. The method according to claim 8, wherein the proportion of antimony tribromide in step (1) produces an admixture from which the solid phase complex (A) which separates is a complex consisting of antimony tribromide and para-xylene.

References Cited in the file of this patent

International Critical Tables, vol. 4 (1928), pages 192-3 and 196. McGraw-Hill Book Co., New York, New York.